Patented July 30, 1940

2,209,304

UNITED STATES PATENT OFFICE 2,209,304

COMPOSITION FOR INCREASING THE THERMAL EMISSIVITY OF A SURFACE AND ITS COMBINATION WITH A SURFACE

William F. Alder, Altadena, Calif., assignor to Jenness A. Alder, Altadena, Calif.

No Drawing. Application September 7, 1937, Serial No. 162,829

10 Claims. (Cl. 134—1)

My invention relates to a composition for and method of increasing the heat transfer to or from a surface.

An object of my invention is to provide a composition which has a high thermal emissivity and which, when applied to most surfaces, will therefore increase their rate of thermal radiation or absorption at any specified temperature.

Another object of my invention is to provide a coating material for a surface which adheres firmly to the surface even at elevated temperatures, and which coating has a high thermal emissivity.

Another object is to provide a coating for a surface which is weather-resistant, which is a protective coating, and which has the property of providing high heat transfer to or from the surface.

A further object of the invention is to provide a high heat radiating and absorbing coating for a surface which is convenient to apply and which dries without odor.

Still another object of my invention is to provide a method for increasing the heat transfer to or from surfaces of relatively low emissivity.

The problem of increasing the heat transfer to or from a surface is a very important one in industry. This problem exists in furnaces, radiators, hot water heaters, orchard heaters, heat exchangers, condensers, et cetera. When the heat transfer coefficient from a surface is low, a relatively great difference in temperature between the surface and the surrounding medium must be maintained in order to assure the passage of a given amount of heat to or from the surface, and greater differences in temperature are generally only obtained by expenditure of work. Thus, in a device wherein transfer of heat across a surface is an essential function, a low heat transfer coefficient for that surface represents a distinct loss of efficiency for the device as a whole.

The heat transfer between a surface and the adjacent medium takes place by two processes, namely, (1) radiation and (2) conduction. A surface receives heat by radiation from its surroundings when the temperature of the surrounding radiating material is higher than the temperature of the surface, and loses heat to its surroundings when the reverse condition exists. The rate of radiation or absorption of heat depends not only on the temperatures but on the character of the surface as expressed in a quantity called the emissivity of the surface. The rate of heat radiation from the surface is proportional to the emissivity of the surface. It is important to note that when heat is absorbed by the surface, the rate of absorption is also proportional to the emissivity of the surface. Thus, regardless of whether the surface loses or gains heat, the rate of radiation or absorption is determined by the emissivity of the surface. Conduction of heat between a surface and an adjacent fluid is determined largely by the condition of the fluid film immediately adjacent the surface, which in turn is dependent upon the character of the surface and the velocity of the fluid past the surface.

It is evident that the surface of a body must determine to a large extent the rate of heat transfer between it and the surroundings. Indeed, I have discovered that it is the molecular character of the outermost layer of the surface that is effective in determining thermal emissivity, and have provided a surface coating that is not only exceptionally efficient in the transfer of heat but is sufficiently stable to remain unaffected by temperatures up to 1000° F. The primary effect of the surface coating employed in the practice of my invention, I believe to be to increase the emissivity of the surface and thereby promote radiation from, or absorption by the surface, as the case may be. I have discovered that a surface coating of dilute alkaline silicate or one in which alkaline silicate is the principal constituent, provides a surface of exceptionally high emissivity, and when applied as a thin coating will increase the heat transfer coefficient of most surfaces. I prefer to use sodium silicate having a ratio of silicon dioxide to sodium oxide of 3.25 or more, because the higher this ratio is, the less is the coating affected by moisture. When using sodium silicate alone as the coating, I prefer to dilute 7½ gallons of the sodium silicate of commerce, having a specific gravity of 41° Baumé, with 2½ gallons of water which is either distilled or substantially free from iron compounds.

The exceptionally high emissivity of the alkaline silicate coating may be attributed to the absorption characteristics of the alkaline silicate molecules. Electromagnetic radiation is best absorbed by molecules having natural periods which correspond to those of the impinging waves. In the present case we should say that the natural periods of the alkaline silicate molecules are such as to correspond well with the periods of vibration of electromagnetic radiation identified as heat. Thus, alkaline silicate is a good absorber of heat, and is, then, naturally a good radiator of heat.

I preferably increase the emissivity of my coating by incorporating in the sodium silicate a mixture of heat absorptive di-tri and tetra arylaminoazine compounds which are mesophenyl-dianilinoamidodiphenazium chloride, mesophenyl-trianilinophenazonium chloride, and mesophenyl-tetra anilinophenazonium chloride. These arylaminoazine compounds appear to have natural periods which supplement those of the alkaline silicate and thus broaden the range of radiation which is absorbed or radiated. The practical effect of incorporation of these heat absorptive compounds in the alkaline silicate is a notable increase in the thermal emissivity over the already remarkable one possessed by the alkaline silicate coating alone. In making this improved composition, I preferably form a saturated aqueous solution of the arylaminoazine compounds in 2 quarts of water and mix this with 7½ gallons of 41° Baumé sodium silicate of 3.25 ratio, and 2 gallons of distilled water.

I have found that this composition, or the high heat transfer coating of alkaline silicate alone, can be improved as regards weather resisting properties by incorporating in it still another mixture of substances preferably comprising about 4 parts of calcium phosphate and 1 part amorphous carbon. These substances are conveniently found in this proportion in the material of commerce known as bone black which also contains about 1% calcium carbonate. In preparing my preferred composition, I preferably form a saturated solution of the above-mentioned arylaminoazine compounds in 2 quarts of distilled water and mix this thoroughly with 5 gallons of 41° Baumé sodium silicate, rapidly stirring the mixture at about 70° F. until it is homogeneous. In another vessel I mix together 7½ pounds of bone black, 2½ gallons of 41° Baumé sodium silicate and 2 gallons of distilled water, this mixture being stirred by a high speed mixer until there results a creamy-smooth viscous fluid. This creamy mixture is then mixed with the first mixture, above, containing the arylaminoazine compounds and alkaline silicate and the whole is stirred vigorously until the composition is homogeneous. It is then ready for use.

The composition prepared in this manner has the correct viscosity to be used in standard air gun spraying equipment such as is used for lacquers and other paints. It may also be applied with a brush or by dipping. It dries without odor in approximately 15 minutes when applied to a metal surface and will not burn off at temperatures under 1000° F. The composition adheres to ordinary sheet iron so firmly that when the iron is heated, a spray of cold water playing on the heated surface will not dislodge the coating. My composition will also protect the surface from rust and corrosion and this is particularly true in the case of hot surfaces where oxidation is increased by the elevated temperature. My composition not only protects the surface from oxidation but also reduces the temperature of the surface by increasing the rate of heat radiation from the surface.

Any of my coating compositions may be applied to black iron, clean iron, galvanized iron, copper, tin, aluminum, brass, bronze, Monel metal, et cetera, and will greatly increase the heat transfer to or from the surface.

It is understood that the proportions of the various constituents herein set forth are given for illustration only and may be varied while still retaining the advantages of the invention. While I prefer to use sodium silicate, I may use other alkaline silicate such as potassium silicate. And it is also understood that other equivalent substances may occur to those skilled in the chemical art and be employed to replace the other constituents of my preferred composition, and additions of other substances may be made, all without departing from the spirit of the invention as defined in the appended claims.

I claim as my invention:

1. In combination, a body having a surface for transfer of heat by radiation, and a thin coating of high emissivity on said surface for increasing said transfer of heat, said coating including alkaline silicate as its predominating constituent.

2. In combination, a body having a surface whose principal purpose is the transfer of heat by radiation, and a thin coating of high emissivity on said surface for increasing said transfer of heat, said coating including sodium silicate as its predominating constituent.

3. In combination, a body having a surface for transfer of heat, and a thin coating on said surface for increasing said transfer of heat and including alkaline silicate and in addition another substance of high thermal emissivity, said alkaline silicate being the predominating constituent of said coating.

4. In combination, a body having a surface primarily for transfer of heat, and a thin coating on said surface including a mixture of alkaline silicate, calcium phosphate, and amorphous carbon.

5. In combination, a body having a surface primarily for transfer of heat, and a thin coating on said surface including a mixture of alkaline silicate and material selected from the group consisting of mesophenyl - dianilinoamidodiphenazium chloride, mesophenyl - trianilinophenazonium chloride, and mesophenyl-tetra anilinophenazonium chloride.

6. In combination, a body having a surface primarily for transfer of heat, and a thin coating on said surface including a mixture of alkaline silicate, calcium phosphate, amorphous carbon, and material selected from the group consisting of mesophenyl-dianilinoamidodiphenazium chloride, mesophenyltrianilinophenazonium chloride, and mesophenyl-tetra anilinophenazonium chloride.

7. A liquid coating composition for increasing the heat transfer to or from a surface comprising an aqueous solution including alkaline silicate and material selected from the group consisting of mesophenyl-dianilinoamidodiphenazium chloride, mesophenyl-trianilinophenazonium chloride, and mesophenyl-tetra anilinophenazonium chloride.

8. A liquid coating composition for increasing the heat transfer to or from a surface comprising an aqueous solution including sodium silicate and material selected from the group consisting of mesophenyl-dianilinoamidodiphenazium chloride, mesophenyl - trianilinophenazonium chloride, and mesophenyl-tetra anilinophenazonium chloride.

9. A liquid coating composition for increasing the heat transfer to or from a surface including amorphous carbon, calcium phosphate, and an aqueous solution of alkaline silicate and material selected from the group consisting of mesophenyl - dianilinoamidodiphenazium chloride, mesophenyl - trianilinophenazonium chloride, and mesophenyl-tetra anilinophenazonium chloride.

10. A liquid coating composition for increasing the heat transfer to or from a surface including amorphous carbon, calcium phosphate, and an aqueous solution of sodium silicate and material selected from the group consisting of mesophenyl - dianilinoamidodiphenazium chloride, mesophenyl - trianilinophenazonium chloride, and mesophenyl-tetra anilinophenazonium chloride.

WILLIAM F. ALDER.